US012407407B2

(12) United States Patent
Li et al.

(10) Patent No.: US 12,407,407 B2
(45) Date of Patent: Sep. 2, 2025

(54) METHOD AND DEVICE FOR CONSTRUCTING INTEGRATED SPACE-TERRESTRIAL NETWORK

(71) Applicant: TSINGHUA UNIVERSITY, Beijing (CN)

(72) Inventors: Yuanjie Li, Beijing (CN); Hewu Li, Beijing (CN); Jiayi Liu, Beijing (CN); Wei Liu, Beijing (CN); Lixin Liu, Beijing (CN); Qian Wu, Beijing (CN); Jun Liu, Beijing (CN); Zeqi Lai, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 18/013,227

(22) PCT Filed: Mar. 24, 2022

(86) PCT No.: PCT/CN2022/082773
§ 371 (c)(1),
(2) Date: Dec. 27, 2022

(87) PCT Pub. No.: WO2023/065598
PCT Pub. Date: Apr. 27, 2023

(65) Prior Publication Data
US 2024/0106528 A1 Mar. 28, 2024

(30) Foreign Application Priority Data
Oct. 22, 2021 (CN) .......................... 202111235735.9

(51) Int. Cl.
*H04B 7/185* (2006.01)
(52) U.S. Cl.
CPC ..... *H04B 7/18519* (2013.01); *H04B 7/18504* (2013.01)

(58) Field of Classification Search
CPC ......................... H04B 7/18504; H04B 7/18519
See application file for complete search history.

(56) References Cited

U.S. PATENT DOCUMENTS

| 2006/0209736 A1* | 9/2006 | Barnhart | H04B 7/18597 370/316 |
| 2008/0099625 A1* | 5/2008 | Yocom | B64G 1/1085 244/158.4 |

(Continued)

FOREIGN PATENT DOCUMENTS

| CN | 108881029 A | 11/2018 |
| CN | 112468206 A | 3/2021 |

(Continued)

OTHER PUBLICATIONS

Yuanjie Li et al., Fractal Rosette: A Stable Space-Ground Network Structure in Mega-constellation, Institute for Network Sciences and Cyberspace, Tsinghua University, May 12, 2021, 17 pages.

(Continued)

*Primary Examiner* — Raymond S Dean
(74) *Attorney, Agent, or Firm* — Womble Bond Dickinson (US) LLP (57) ABSTRACT

Provided by the present application are a method and a device for constructing integrated space-terrestrial network, the method including: obtaining a target constellation and standardizing a relative motion between each target satellite in the target constellation and earth's surface according to a principle of making a satellite running in a recursive earth-repeat orbit have fixed satellite subpoint trajectories; obtaining a recursively extended topological structure according to the target constellation; according to the extended topological structure, dividing geographical cells and obtaining a mapping relationship between the geographical cells and the satellite subpoint trajectories to facilitate network addressing and networking management based on geographical (Continued)

location; and performing, based on a deployment rule, a recursive incremental deployment according to the extended satellite network topological structure, and realizing integrated space-terrestrial network.

16 Claims, 5 Drawing Sheets

(56) References Cited

U.S. PATENT DOCUMENTS

| | | | | |
|---|---|---|---|---|
| 2010/0149306 A1* | 6/2010 | Gopal | ................... | H04N 7/152 |
| | | | | 348/E7.078 |
| 2018/0309508 A1 | 10/2018 | Regan et al. | | |
| 2021/0167847 A1* | 6/2021 | Jin | ...................... | H04B 7/1851 |

FOREIGN PATENT DOCUMENTS

| | | | | |
|---|---|---|---|---|
| CN | 113329467 A | 8/2021 | | |
| CN | 114039644 A | 2/2022 | | |
| WO | WO-2018148920 A1 * | 8/2018 | ............. | H04B 7/185 |

OTHER PUBLICATIONS

First Office Action for Chinese Application No. 202111235735.9 mailed Jun. 1, 2022, 8 pages.
International Search Report and Written Opinion for International Application PCT/CN2022/082773, dated Jul. 6, 2022, 9 pages.

* cited by examiner

| $c_0$ | $c_1$ | ... | $c_k$ |
|---|---|---|---|
| $row_0$ $col_0$ | $row_1$ $col_1$ | ... ... | $row_k$ $col_k$ |

METHOD AND DEVICE FOR CONSTRUCTING INTEGRATED SPACE-TERRESTRIAL NETWORK

CROSS-REFERENCE TO RELATED APPLICATIONS

The present application is a US national phase application under 35 USC § 371 of International Application No. PCT/CN2022/082773, filed Mar. 24, 2022, and claims priority to Chinese Application No. 202111235735.9, filed on Oct. 22, 2021, entitled "Method and Device for Constructing Integrated Space-Terrestrial Network", which is hereby was incorporated by reference in its entirety.

TECHNICAL FIELD

The present application relates to the technical field of satellite communication, in particular to a method and a device for constructing integrated space-terrestrial network.

BACKGROUND

At present, most of terrestrial networks and services widely use IP (Internet Protocol, IP) to realize interconnection, to form a mature global Internet ecosystem. A realization of integrated space-terrestrial network based on IP is conducive to integrating and cooperating with existing network service and integrating network resources, which helps service providers realize an expansion of global network service, better meets the requirements of personal communication and information acquisition, and improves user's experience and satisfaction.

The existing terrestrial IP network architecture oriented to high spatial-temporal dynamic of connection and heterogeneous interconnection of space-terrestrial network faces new challenges of efficient integration, stability and scalability. The traditional IP network architecture is mainly oriented to terrestrial wired network, and its network topology and link are relatively stable. The relative high-speed motion between the satellite and the earth causes global high dynamic time-variant of network infrastructure, frequent changes in inter-satellite and satellite-terrestrial links and topologies, uneven allocation of the resources such as computation, storage and bandwidth, and high symbol error rate of communication line. And, due to the different spatial-temporal scales and long-term independent development, the terrestrial network and space network have highly heterogeneous architectures and are difficult to integrate efficiently.

SUMMARY

The present application provides a method for constructing integrated space-terrestrial network (ISTN) to solve the defects of difficult integration and cooperation of satellite-terrestrial network in the related art and realize integrated space-terrestrial network.

A method for constructing integrated space-terrestrial network, including:
  obtaining a target constellation and standardizing a relative motion between each target satellite in the target constellation and earth's surface according to a principle of making a satellite running in a recursive earth-repeat orbit have fixed satellite subpoint trajectories;
  obtaining a recursively extended topological structure according to the target constellation;
  according to the extended topological structure, dividing geographical cells and obtaining a mapping relationship between the geographical cells and the satellite subpoint trajectories to facilitate network addressing and networking management based on geographical location; and
  performing, based on a deployment rule, a recursive incremental deployment according to the extended satellite network topological structure, and realizing integrated space-terrestrial network.

In an embodiment, the obtaining the target constellation and standardizing the relative motion between each target satellite in the target constellation and earth's surface according to the principle of making the satellite running in the recursive earth-repeat orbit have fixed satellite subpoint trajectories includes:
  adjusting a period of the target satellite to make the target satellite form a fixed satellite subpoint trajectory;
  setting an orbital height of the target satellite based on the height adjustment rule to meet a full coverage of the target constellation for terrestrial communication; and
  adjusting the period and the orbital height of the target satellite and forming the target constellation, to make each target satellite form a fixed satellite subpoint trajectory and meet the full coverage for terrestrial communication.

In an embodiment, the obtaining the recursively extended topological structure according to the target constellation includes:
  constructing a base-class topological structure according to the target constellation and making each target satellite in the base-class topological structure share the same fixed satellite subpoint trajectory; and
  recursively extending the base-class topological structure according to an extension rule and forming the extended topological structure.

In an embodiment, after the constructing the base-class topological structure according to the target constellation and making each target satellite in the base-class topological structure share the same fixed satellite subpoint trajectory, the method further includes:
  setting a symmetric inter-satellite link mode for each target satellite in the base-class topological structure.

In an embodiment, the recursively extending the base-class topological structure according to the extension rule and forming the extended topological structure includes:
  during recursively extending, maintaining original inter-orbit link and adding intra-orbit link for adjacent satellites after temporal shift.

In an embodiment, the according to the extended topological structure, dividing geographical cells and obtaining a mapping relationship between the geographical cells and the satellite subpoint trajectories includes:
  dividing the geographical cells according to an area on earth's surface formed by intersection of the fixed satellite subpoint trajectory of each target constellation in the extended topological structure;
  taking a preset location point of each geographical cell as an identification of each geographical cell; and
  coding the divided geographical cells, obtaining a mapping relationship between a code of each geographical cell and each fixed satellite subpoint trajectory, and forming a network addressing based on geographical location.

In an embodiment, the performing, based on the deployment rule, the recursive incremental deployment according to the extended satellite network topological structure, and realizing integrated space-terrestrial network includes:

based on a principle of full coverage for terrestrial communication, deploying an extended satellite network topological structure layer by layer and reducing an orbital height with an increase of layers to form a network structure having a backbone network and an access network.

The present application further provides a device for constructing integrated space-terrestrial network, including:

a target constellation obtaining unit, which is configured to obtain a target constellation and standardize a relative motion between each target satellite in the target constellation and the earth's surface according to a principle of making a satellite running in a recursive earth-repeat orbit have fixed satellite subpoint trajectories;

an extended topological structure obtaining unit, which is configured to obtain a recursively extended topological structure according to the target constellation;

a geographical cell dividing unit, which is configured to according to the extended topological structure, divide geographical cells and obtain a mapping relationship between the geographical cells and the satellite subpoint trajectories to facilitate network addressing and networking management based on geographical location; and a deploying unit, which is configured to perform, based on a deployment rule, a recursive incremental deployment according to the extended satellite network topological structure, and realize integrated space-terrestrial network.

An electronic apparatus, including a memory, a processor, and a computer program stored in the memory and executable by the processor, where, when the program is executed by the processor, causes the processor to implement the steps of the method for constructing integrated space-terrestrial network.

A non-transient computer readable storage medium, having computer program stored therein, where, when the program is executed by the processor, causes the processor to implement the steps of the method for constructing integrated space-terrestrial network.

In the method and the device for constructing integrated space-terrestrial network provided by the present application, a recursive-scalable integrated space-terrestrial network and addressing scheme based on the fixed satellite subpoint trajectory is proposed, which can realize a unified spatial-temporal benchmark of the logical network in virtual space and the target constellation in real physical space, and make the existing terrestrial network architecture adapt to the new environment of satellite-terrestrial integration, thereby being beneficial to realize the expansion of global network service and better meet the requirements of communication and information acquisition.

BRIEF DESCRIPTION OF DRAWINGS

In order to more clearly illustrate the technical solutions according to the present application or the related art, the accompanying drawings required to be used in the description of the embodiments or the related art will be briefly introduced as follows. It should be noted that the drawings in the following description are part of embodiments of the present application. For those skilled in the art, other drawings can be obtained based on these drawings without creative efforts.

DETAILED DESCRIPTION OF THE EMBODIMENTS

In order to explain the objectives, technical solutions, and advantages of the present application more clearly, the technical solutions according to the present application will be clearly and completely described below in conjunction with the drawings in the present application. It should be noted that, the described embodiments are part of embodiments of the present application, rather than all of the embodiments. Based on the embodiments in the present application, all other embodiments obtained by those of ordinary skill in the art without creative work are within the scope of protection of the present application.

With the continuous development of Internet technology and the growing demand of users for global Internet service, there is an urgent need for the construction of integrated space-ground (satellite-terrestrial) network. The integrated space-terrestrial network is based on the terrestrial network and extended by the satellite network, covering different spaces such as aerospace, sky, land and ocean, and providing information guarantee for various user activities. Satellite network in space and terrestrial network have a strong complementary relationship in terms of coverage area and mobile access, and the services of them show a trend of integration. The construction of integrated space-terrestrial network is conducive to extending the service scope of service providers from ground to space and from regional to global, transforming a best-effort service of traditional Internet to a deterministic global service, and forming an autonomous and controllable next-generation smart information network.

Integration based on IP (Internet Protocol, IP) network architecture is a key to the success of integrated space-terrestrial network. At present, most terrestrial networks and services widely use IP to realize interconnection, and to form a mature global Internet ecosystem. A realization of integrated space-terrestrial network based on IP is conducive to integrating and cooperating with existing network services and integrating network resources, which helps service providers realize an expansion of global network service, better meets the requirements of personal communication and information acquisition, and improves user's experience and satisfaction.

However, the existing terrestrial IP network architecture oriented to high spatial-temporal dynamic of connection and heterogeneous interconnection of space-terrestrial network faces new challenges of efficient integration, stability, and scalability. The traditional IP network architecture is mainly oriented to the terrestrial wired network, and its network topology and link are relatively stable. The high-speed motion of the satellite relative to the earth causes global high dynamic time-variant of network infrastructure, frequent changes in inter-satellite and satellite-terrestrial links and topologies, uneven allocation of the resources such as computation, storage and bandwidth, and high symbol error rate of communication lines. And, due to the different spatial-temporal scales and long-term independent development, the terrestrial network and space network have highly heterogeneous architectures and are difficult to integrate efficiently. These all lead to low efficiency, instability and uneasy extension of the integrated space-terrestrial network based on existing IP technology.

The fundamental reason of the above problems is a mismatch between logical network in virtual space and mega-constellation in real physical world. The design of existing mega-constellation ignores the stable network topology, addressing and routing requirement. In addition, high mobility is traditionally regarded as a negative challenge and is attempted to be bypassed. Although some schemes can be used in small constellation, they have problems such as high cost, complex network architecture and complex protocol. Thus these schemes are difficult to extend to low-orbit mega-constellation in the long run.

In order to solve the above problems, the present application provides a recursive-scalable and uniform scheme of constructing integrated space-terrestrial network based on fixed satellite subpoint trajectory, which can realize a unified spatial-temporal benchmark of the virtual cyberspace and the real physical space.

Figure 1:
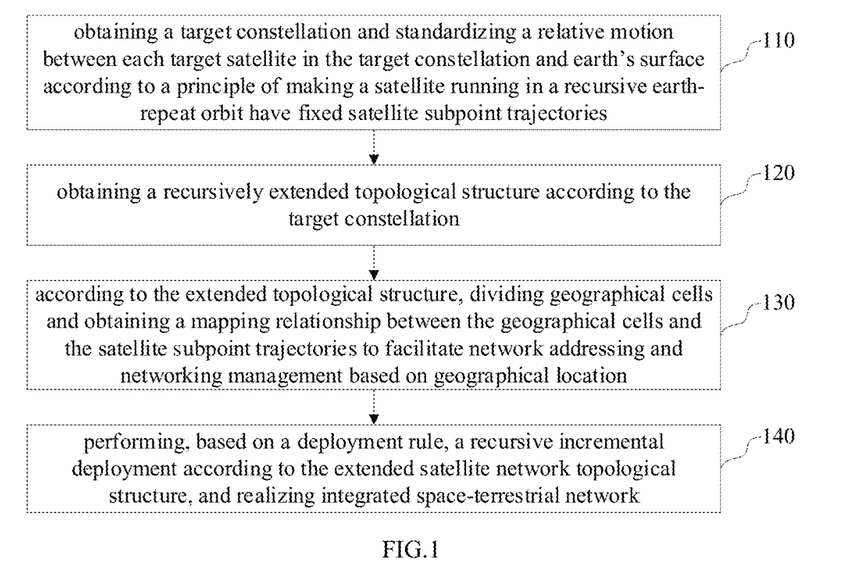
FIG. 1 is a flowchart of a method for constructing integrated space-terrestrial network provided by embodiments of the present application.

As shown in FIG. 1, embodiments of the present application provide a method for constructing integrated space-terrestrial network, and the method includes the following steps.

Step 110: obtaining a target constellation and standardizing a relative motion between each target satellite in the target constellation and earth's surface according to a principle of making a satellite running in a recursive earth-repeat orbit have fixed satellite subpoint trajectories.

Specifically, in step 110, a mega-constellation (target constellation) is constructed based on the fixed satellite subpoint trajectory of satellite-terrestrial cooperation.

Figure 2:
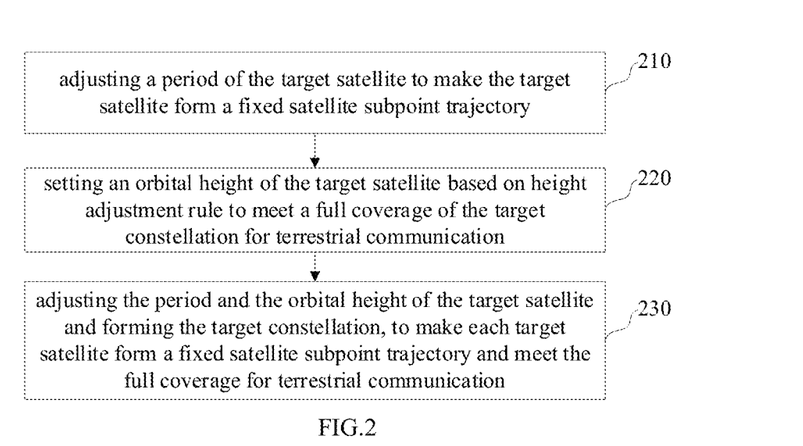
FIG. 2 is a flowchart of a specific method of step 110 in FIG. 1.

Specifically, in the embodiments of the present application, as shown in FIG. 2, step 110 includes the following steps.

Step 210: adjusting a period of the target satellite to make the target satellite form a fixed satellite subpoint trajectory.

Specifically, the period T of every target satellite is adjusted to satisfy:

$$T = M/n \cdot T_E \tag{1}$$

where, $T_E$ is a period before adjustment, M is a time parameter, n is a frequency parameter, and an adjustment by formula (1) makes the target satellite periodically revisit the same satellite subpoint trajectory n times in M days.

Step 220: setting an orbital height of the target satellite based on height adjustment rule to meet a full coverage of the target constellation for terrestrial communication.

Specifically, the orbital height is set based on an adjustment rule:

$$H > H_{min} \tag{2}$$

where, H is an orbital height after adjustment, and $H_{min}$ is a minimum orbital height, and $$H_{min} = R_E(1/(\cos R - \sin R \tan \phi) - 1) \tag{3}$$

$$R = \sec^{-1}(\sqrt{3}\tan(\pi/6 \cdot N/(N-2))) \tag{4}$$

where, $R_E$ is a radius of the earth, R is an arc length of a sector area covered by the target satellite communicating with the earth, $\phi$ is an angle between the target satellite orbit and the earth's equator, N is a number of target satellites to realize the full coverage for terrestrial communication.

Step 230: adjusting the period and the orbital height of the target satellite and forming the target constellation, to make each target satellite form a fixed satellite subpoint trajectory and meet the full coverage for terrestrial communication.

Specifically, the period and the orbital height of the target satellite are adjusted according to Kepler's third law to satisfy:

$$(R_E + h)^3 / T_S^2 = k \tag{5}$$

where, k is a Kepler constant, $R_E$ is the radius of the earth, h is an actual orbital height of the target satellite, and $T_S$ is an actual period of the target satellite; and the actual orbital height and the actual period are obtained by adjusting according to formula (5) after obtaining the adjusted orbital height and period according to formula (1) and formula (2).

Step 120: obtaining a recursively extended topological structure according to the target constellation.

Specifically, in step 120, a recursively extended satellite network topological structure and inter-satellite links are designed based on the mega-constellation obtained in step 110, to realize global uniform coverage.

Figure 3:
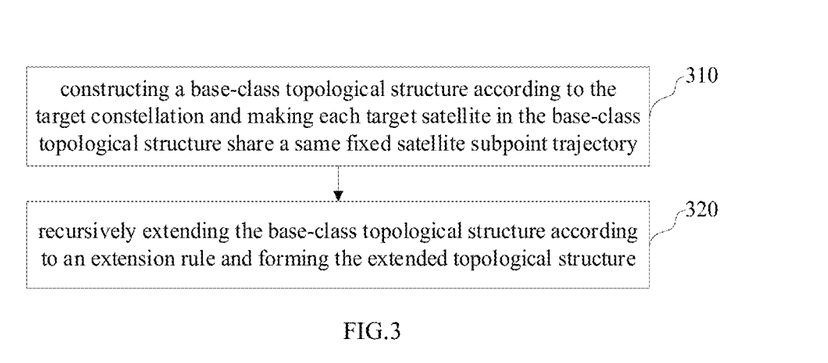
FIG. 3 is a flowchart of a specific method of step 120 in FIG. 1.

Specifically, in the embodiments of the present application, as shown in FIG. 3, step 120 includes the following steps.

Step 310: constructing a base-class topological structure according to the target constellation and making each target satellite in the base-class topological structure share a same fixed satellite subpoint trajectory.

Specifically, in the embodiments of the present application, after step 310, the method further includes: setting a symmetric inter-satellite link mode for each target satellite in the base-class topological structure.

Step 320: recursively extending the base-class topological structure according to an extension rule and forming the extended topological structure.

Specifically, in step 320, the base-class topological structure is recursively extended by shifting the target satellite num times $t_k=num\cdot 1/N^k$(num=0~N−1, N>0) time intervals, where N is a number of target satellites.

Specifically, step 320 includes: during recursively extending, maintaining original inter-orbit link and adding intra-orbit link for adjacent satellites after shifting the time intervals.

Step 130: according to the extended topological structure, dividing geographical cells and obtaining a mapping relationship between the geographical cells and the satellite subpoint trajectories to facilitate network addressing and networking management based on geographical location.

Specifically, in step 130, according to the characteristics of the fixed satellite subpoint trajectories, hierarchical geographical cells are obtained by dividing and coding the geographical cells, to realize an accurate mapping between the geographical cells and the satellite subpoint trajectories, which facilitates the design of network addressing and mobility management on this network architecture.

Figure 4:
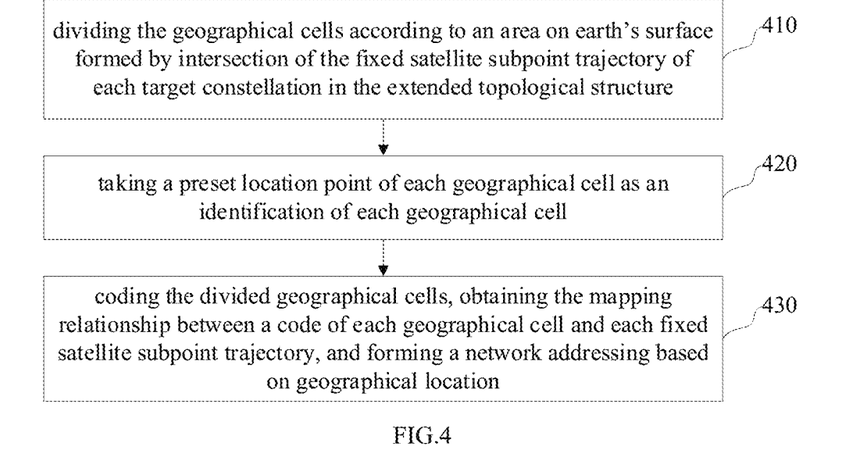
FIG. 4 is a flowchart of a specific method of step 130 in FIG. 1.

Specifically, in the embodiments of the present application, as shown in FIG. 4, step 130 includes the following steps.

Step 410: dividing the geographical cells according to an area on earth's surface formed by intersection of the fixed satellite subpoint trajectory of each target constellation in the extended topological structure.

Specifically, the geographical cells are divided according to quadrilaterals formed by intersection of all trajectories on earth's surface based on the fixed satellite subpoint trajectories on earth's surface formed by all the target satellites running in the recursive orbit. For an arc part near a polar region, two latitude lines with latitudes equal to an orbital inclination are added to form an arc triangle to facilitate cells division and subsequent cell numbering.

In the embodiments of the present application, because of a recursive nature constructed by the extended topological structure in step 120, there is a multiple relationship among numbers of the geographical cells divided by upper layer structure and lower layer structure of the topological structure, and then the hierarchical geographical cells are formed on earth's surface.

Step 420: taking a preset location point of each geographical cell as an identification of each geographical cell.

Specifically, each geographical cell is generally formed and enclosed by four satellite subpoint trajectories. An intersection of the satellite subpoint trajectories in the quadrilateral, such as a left vertex of a cell, can be selected to uniquely identify the cell. According to the Euler theorem, the number of vertices is equal to the number of the geographical cells, then the mapping between geographical cells and the satellite subpoint trajectories is realized.

Step 430: coding the divided geographical cells, obtaining the mapping relationship between a code of each geographical cell and each fixed satellite subpoint trajectory, and forming a network addressing based on geographical location.

Specifically, according to the divided uniform and hierarchical geographical cells, the geographical cells are numbered based on row and column characteristics of the geographical cells, and then the geographical cells are coded according to the hierarchical characteristics of the geographical cells, to complete forming a corresponding mapping relationship between the codes of geographical cells and the satellite subpoint trajectories.

Step 140: performing, based on a deployment rule, a recursive incremental deployment according to the extended satellite network topological structure, and realizing integrated space-terrestrial network.

Specifically, in step 140, an incremental space-terrestrial networking scheme is designed for the recursive-scalable network topological structure, and the extended satellite network is deployed layer by layer to form a backbone network and an access network, thereby enabling layer-by-layer expansion while meeting the global coverage, which realizes a stable, efficient and scalable global uniform networking.

Specifically, in step 140, based on a principle of full coverage for terrestrial communication, the extended satellite network topological structure is deployed layer by layer and the orbital height is reduced with an increase of layers to form a network structure having a backbone network and an access network. Specifically, an upper network structure is firstly deployed in an orbit at a higher height to realize the full coverage on earth's surface, and the orbital height is reduced when deploying the next layer network. Based on the selected orbital height, satellites in the kth layer are taken as the backbone network, and then satellites in the k-1th layer are connected thereto to realize progressive expansion deployment.

The method provided by the embodiments of the present application supports incremental deployment and meets existing technical requirements, which is conducive to integrating and cooperating with existing network service, integrating network resources, and realizing an expansion of global network service, which better meets the requirements of communication and information acquisition. The method provided by the embodiments of the present application can be applied not only to existing IP Internet architectures, but also to other network architectures, such as 5G/6G, MPLS, CCSDS, SDN, etc., and even to future Internet architectures.

Standard (N, m) Rosette constellation is taken as the base-class topological structure F-Rosette$_0$ below, where, N is a number of satellites, each of which runs in each orbit, and m is a phase factor. On this basis, in conjunction with the method provided by the embodiments of the present application, the fixed satellite subpoint trajectory and global coverage are realized, the recursive-scalable satellite network topology is constructed, an inter-satellite link mode having symmetric structure is designed, hierarchical geographical cells are formed, and the mapping between geographical cells and the satellite subpoint trajectories, the cell coding method, and recursive incremental deployment are provided.

Figure 5:
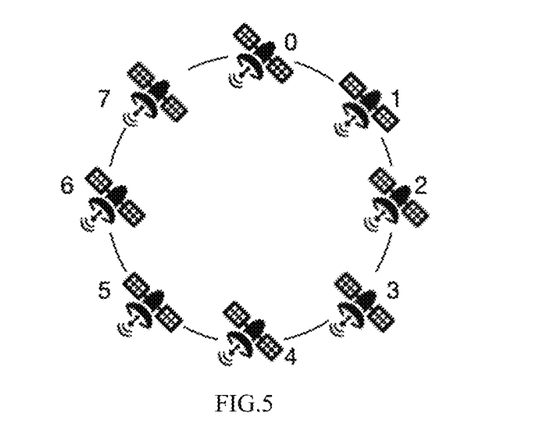
FIG. 5 is a structural diagram of a base-class topological structure provided by embodiments of the present application.
Figure 6:
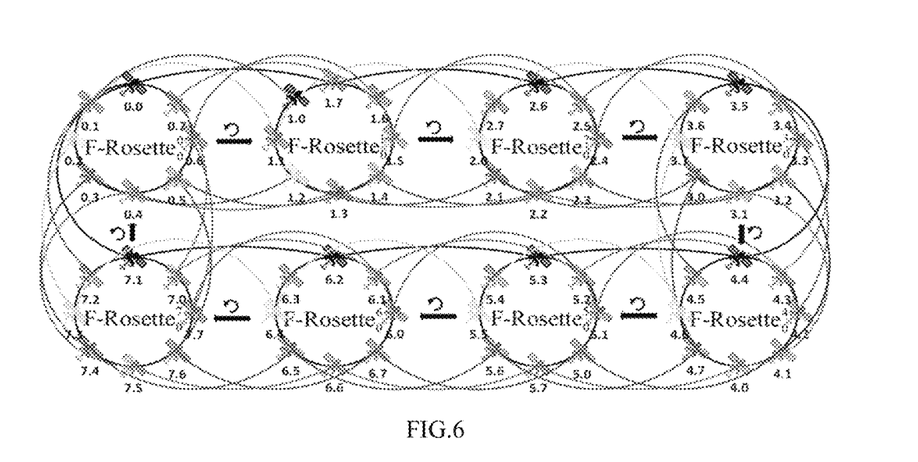
FIG. 6 is a two-dimensional diagram of a topological structure of kth layer in recursively extended F-Rosette provided by embodiments of the present application.
Figure 7:
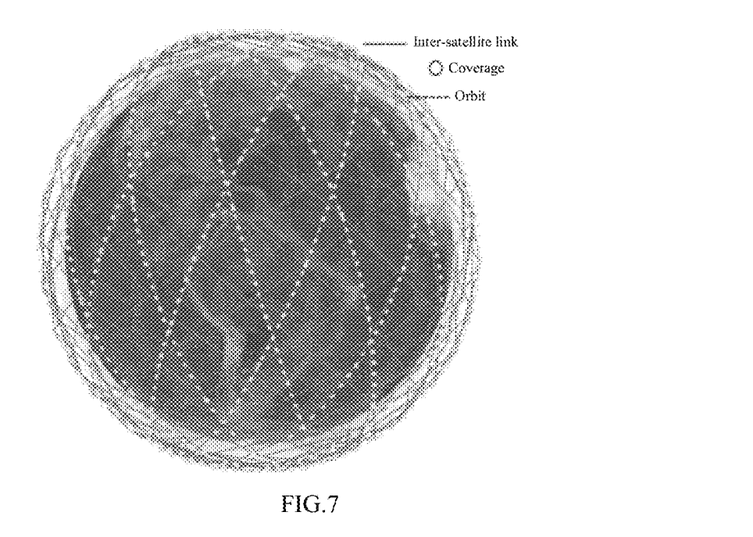
FIG. 7 is a three-dimensional diagram of a constellation topological structure provided by embodiments of the present application.

In conjunction with FIG. 5, i.e., a structural diagram of a base-class topological structure, FIG. 6, i.e., a two-dimensional diagram of a topological structure of kth layer in recursively extended F-Rosette, and FIG. 7, i.e., a three-dimensional diagram of a constellation topological structure, the process of constructing recursive-scalable satellite network topological structure corresponding to step 120 described in the embodiments of the present application is described as follows.

A. Constructing a 0th Layer Topological Structure.

The 0th layer is standard (N, m) F−Rosette$_0$, according to $T_E/T_S=N-m$, $T_E$ is the period before adjustment, $T_S$ is the actual period. A recursive orbit period is set, to make N satellites in different orbits in the topological structure have the same fixed satellite subpoint trajectory. As shown in FIG. 5, the topological structure composed of eight target satellites is the base-class topological structure, that is, the 0th layer topological structure.

B. Recursively Constructing a Kth Layer Topological Structure by k-1th Layer Topological Structure Composed of N Satellites, k≥1.

The satellites F-Rosette$_{k-1}$ in the k-1th layer are shifted by a time interval $t_k$=num·$T_S$/$N^k$ (num=0~N-1) respectively, which is equivalent to shift the phase angles $\chi_k$=2π/$T_S$·$t_k$=num 2π/$N^k$. The N satellites F-Rosette$_{k-1}$ after being shifted by the time interval are named as F-Rosette$_{k-1}^0$, F-Rosette$_{k-1}^1$, ..., F-Rosette$_{k-1}^{N-1}$ respectively, which are all satellites in the Kth layer. Where, each satellite $S_j$ in F-Rosette$_{k-1}^0$ is replicated N times on the same orbit, denoted as $S_j^0$, $S_j^1$, ..., $S_j^{N-1}$. As shown in FIG. 6, based on the base-class topological structure in the upper left corner in FIG. 6, the base-class topological structure (the 0th layer topological structure) includes eight target satellites with the serial number of 0.0-0.7. By shifting a time interval for the base-class topological structure, a set of topological structures with the satellite serial number of 1.0-1.7 can be obtained. Two groups of satellites with the serial number of 0.0-0.7 and the serial number of 1.0-1.7 form the Ith layer topological structure, and other layer topological structures can be continually obtained by shifting the time interval.

In conjunction with FIG. 6, i.e., a two-dimensional diagram of a topological structure of kth layer in recursively extended F-Rosette, and FIG. 7, i.e., a three-dimensional diagram of a constellation topological structure, the process of designing an inter-satellite link mode having symmetric structure based on recursively extended satellite network topology corresponding to step 120 described in the embodiments of the present application is described as follows.

C. For each target satellite in the base-class topological structure, two inter-satellite links are used to connect adjacent satellites in adjacent orbits to form a ring topology.

D. Keeping two inter-orbit links of each satellite unchanged and adding intra-orbit link to each adjacent satellite after shifting the time interval in each recursion, that is, each satellite $S_i$ in F-Rosette$_{k-1}^i$ adds a link to the satellite $S_{(i+1\ mod\ N)}$ in F-Rosette$_{k-1}^{(i+1\ mod\ N)}$, to create a circle among satellites on the same orbit. Therefore, for the satellites in kth layer, they have $(k+1)N^{k+1}$ inter-satellite links.

Figure 8:
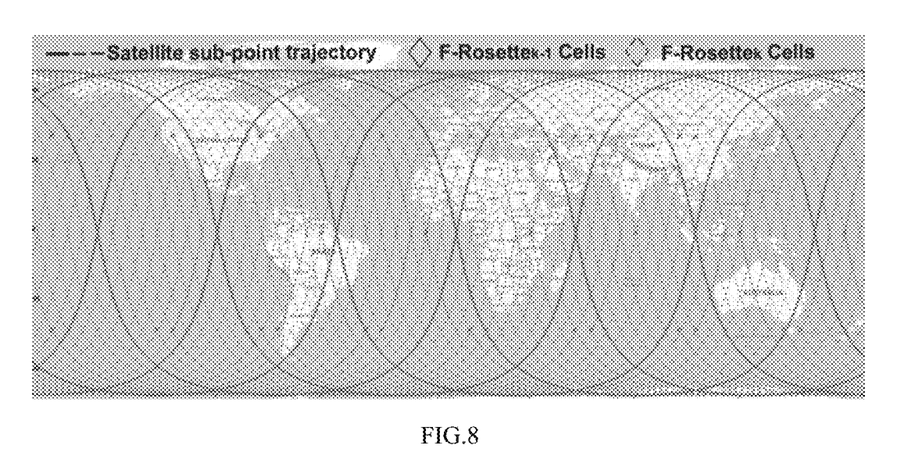
FIG. 8 is a diagram showing a division of hierarchical geographical cells on earth's surface provided by embodiments of the present application.
Figure 9A:
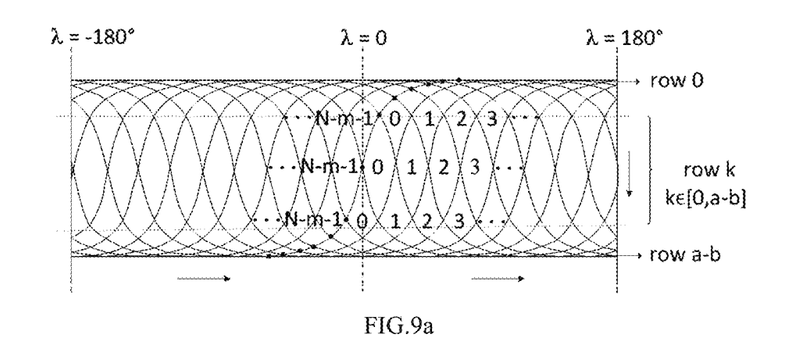
FIG. 9a is a diagram showing numbering of hierarchical geographical cells on earth's surface provided by embodiments of the present application.
Figure 9B:
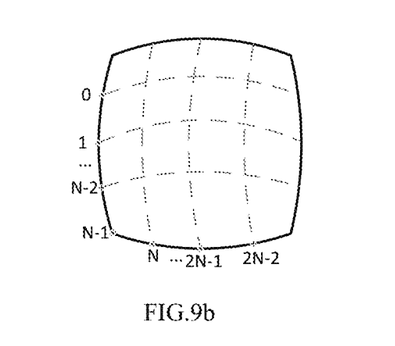
FIG. 9b is a structural diagram of hierarchical geographical cells on earth's surface provided by embodiments of the present application.

In conjunction with FIG. 8, i.e., a diagram showing a division of hierarchical geographical cells, FIG. 9*a*, a diagram showing numbering of hierarchical geographical cells, and FIG. 9*b*, i.e., a structural diagram of hierarchical geographical cells, the process of dividing hierarchical geographical cells according to the characteristics of fixed satellite subpoint trajectories corresponding to step 130 described in the embodiments of the present application is described as follows.

E. Dividing the geographical cells according to a quadrilateral formed by intersection of all trajectories on earth's surface based on a fixed satellite subpoint trajectories on earth's surface formed by all the target satellites running in the recursive orbit. For an arc part near a polar region, adding two latitude lines with latitudes equal to an orbital inclination to form an arc triangle to facilitate cell division and numbering. As shown in FIG. 8, the curves in FIG. 8 are the satellite subpoint trajectories, and based on recursive topology, the (k-1)th hierarchical geographical cells and the kth hierarchical geographical cells are formed.

F. According to the network topology constructing process, the time interval of each layer when performing recursion is 1/N that of the upper layer, so each cell on the earth's surface formed by the (k-1)th layer (k≥1) is divided into $N^2$ sub-cells by the kth layer. As shown in FIG. 9*b*, all geographical cells have hierarchical structures.

Figure 10:
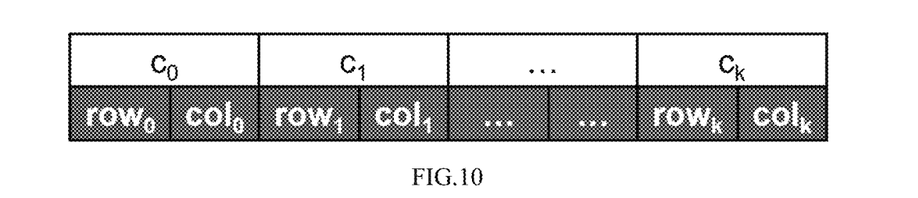
FIG. 10 is a diagram showing coding of hierarchical geographical cells provided by embodiments of the present application.

In conjunction with FIG. 9*a*, i.e., a diagram showing numbering of hierarchical geographical cells on earth's surface, FIG. 9*b*, i.e., a structural diagram of hierarchical geographical cells on earth's surface, and FIG. 10, i.e., a diagram showing coding of hierarchical geographical cells, the process of providing the coding mode and the mapping between the geographical cells and the satellite subpoint trajectories based on the hierarchical geographical cells corresponding to step 130 described in the embodiments of the present application is described as follows.

G. Each geographical cell is generally enclosed by four satellite subpoint trajectories. A left vertex of a cell is selected to identify the cell. According to the Euler theorem, the number of vertices is equal to the number of the geographical cells, then mapping between geographical cells and the satellite subpoint trajectories is realized.

H. Numbering the geographical cells based on row and column characteristics of the hierarchical geographical cells. As shown in FIG. 9*a*, dividing the Earth into N-m rows and N-m columns by two latitude lines and the satellite subpoint trajectories of the 0th layer satellites, and identifying each cell by the left vertex of the quadrilateral. Numbering the rows from 0 to N-m-1 in the order from north to south, and numbering, according to the direction of longitude increase, cells of each row from 0 to N-m-1 starting from a cell whose left intersection point is on the trajectory of satellite with latitude and longitude of 0 above the equator and its extension line. The kth layer divides each cell in the (k-1)th layer (k≥1) into 2N-1 layers, therefore, numbering each layer from 0 to 2N-2 in the direction from north to south, and numbering cells in each layer from 0 in the direction from left to right.

I. Coding the geographical cells based on the hierarchical characteristics of the geographical cells. As shown in FIG. 10, each geographical cell in kth layer can be uniquely identified by $c_0$, $c_1$, ..., $c_k$, where, $c_0$=0,1, ..., $(N-m)^2-1$ and $c_i$=0,1, ..., $N^2-1$ (i≠0). Each number $c_i$ represents a cell, where the user belongs to, in the geographic location cell formed by the satellites in ith layer, which can be decomposed into row ID and column ID.

Figure 11:
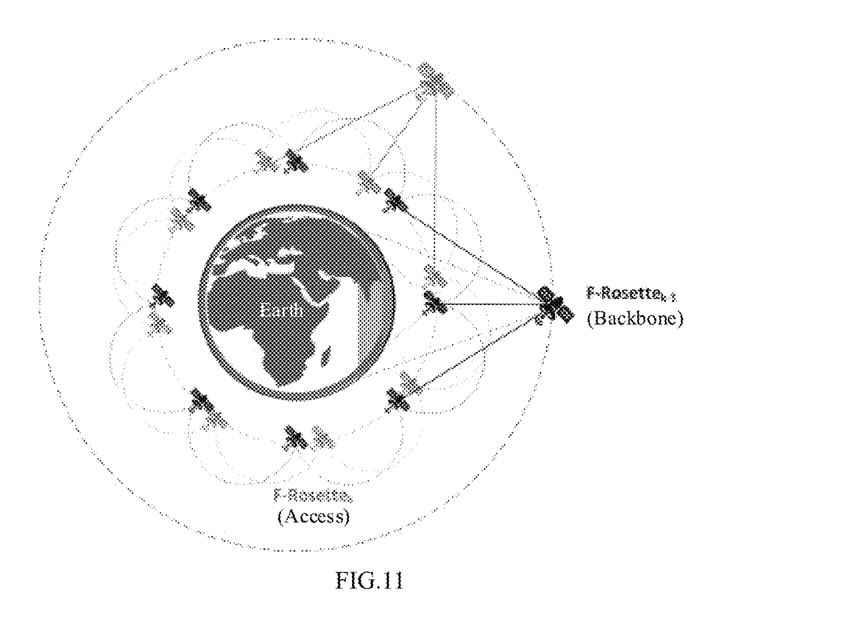
FIG. 11 is a diagram showing a recursive incremental deployment of a topological structure provided by embodiments of the present application.

In conjunction with FIG. 11, i.e., a diagram showing a recursive incremental deployment, the process of providing recursive incremental deployment based on stable and scalable network structure described in the embodiments of the present application is described as follows.

J. Deploying the upper network structure in an orbit at a higher height to realize the full coverage on earth's surface, and reducing the orbital height when deploying the next layer network.

K. Based on the selected orbital height in process J, taking satellites in the kth layer as the backbone network, and then connecting satellites in the k-1th layer to realize progressive expansion deployment.

The methods provided by the embodiments of the present application can ensure efficient, stable and scalable global network interconnection and integration in the environment of high spatial-temporal dynamic of connection and space-terrestrial heterogeneous interconnection. The recursive-scalable uniform scheme of constructing integrated space-terrestrial network based on fixed satellite subpoint trajectory provided by the embodiments of the present application can be applied to the design of the integrated space-terrestrial network under the mega-constellation, help the existing network architecture adapt to the new environment of the space-terrestrial integration, solve the contradiction between the "high spatial-temporal dynamic of connection and heterogeneous interconnection between space and ground" and the "stable, efficient and scalable requirements of network architecture", realize the stable, efficient and scalable integration of global space-terrestrial network, help to realize the expansion of global network service, and better meet the requirements of communication and information acquisition.

An embodiment of the present application provides a device for constructing integrated space-terrestrial network. The device for constructing integrated space-terrestrial network and the method for constructing integrated space-terrestrial network described above can correspond to each other. The device includes a memory, a processor and a computer program stored in the memory and executable by the processor, where, when the program is executed by the processor, causes the processor to:

obtain a target constellation and standardize a relative motion between each target satellite in the target constellation and earth's surface according to a principle of making a satellite running in a recursive earth-repeat orbit have fixed satellite subpoint trajectories;

obtain a recursively extended topological structure according to the target constellation;

according to the extended topological structure, divide geographical cells and obtain a mapping relationship between the geographical cells and the satellite subpoint trajectories to facilitate network addressing and networking management based on geographical location; and perform, based on a deployment rule, a recursive incremental deployment according to the extended satellite network topological structure, and realize integrated space-terrestrial network.

Figure 12:
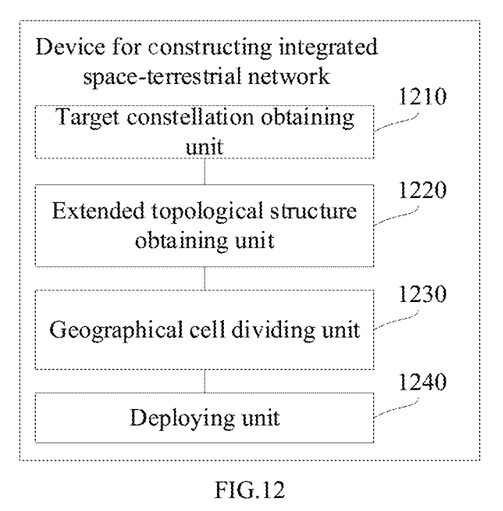
FIG. 12 is a structural diagram of a device for constructing integrated space-terrestrial network provided by embodiments of the present application.

A device for constructing integrated space-terrestrial network provided by the embodiments of the present application is described below. The device for constructing integrated space-terrestrial network described below and the method for constructing integrated space-terrestrial network described above can correspond to each other. As shown in FIG. 12, the device for constructing integrated space-terrestrial network provided by the embodiments of the present application includes the following units.

A target constellation obtaining unit 1210, which is configured to obtain a target constellation and standardize a relative motion between each target satellite in the target constellation and earth's surface according to a principle of making a satellite running in a recursive earth-repeat orbit have fixed satellite subpoint trajectories.

In the embodiments of the present application, the target constellation obtaining unit 1210 includes:

a period adjusting sub-unit, which is configured to adjust a period of the target satellite to make the target satellite form a fixed satellite subpoint trajectory;

an orbital height adjusting sub-unit, which is configured to set an orbital height of the target satellite based on height adjusting rule, to meet a full coverage of the target constellation for terrestrial communication; and a period and orbit height coordinated adjusting sub-unit, which is configured to adjust the period and orbital height of the target satellite, and form the target constellation, to make each target satellite form fixed satellite subpoint trajectory and meet the full coverage for terrestrial communication.

An extended topological structure obtaining unit 1220, which is configured to obtain a recursively extended topological structure according to the target constellation.

In the embodiments of the present application, the extended topological structure obtaining unit 1220 includes:

a base-class topological structure constructing sub-unit, which is configured to construct a base-class topological structure according to the target constellation and making each target satellite in the base-class topological structure share a same fixed satellite subpoint trajectory;

specifically, the base-class topological structure constructing sub-unit includes an inter-satellite link setting sub-unit, which is configured to set a symmetric inter-satellite link mode for each target satellite in the base-class topological structure;

and a base class topological structure extending sub-unit, which is configured to recursively extend the base-class topological structure according to an extension rule and form the extended topological structure;

specifically, the base class topological structure extending sub-unit maintains, during recursive extension, original inter-orbit link and adds intra-orbit link for adjacent satellites after temporal shift by the inter-satellite link setting sub-unit in the recursive extension process.

A geographical cell dividing unit 1230, which is configured to, according to the extended topological structure, divide geographical cells and obtain a mapping relationship between the geographical cells and the satellite subpoint trajectories to facilitate network addressing and networking management based on geographical location.

In the embodiments of the present application, the geographical cell dividing unit 1230 includes:

a satellite subpoint trajectory dividing sub-unit, which is configured to divide the geographical cells according to an area on earth's surface formed by intersection of fixed satellite subpoint trajectory of each target constellation in the extended topological structure;

a cell identification determining sub-unit, which is configured to take a preset location point of each geographical cell as an identification of each geographical cell; and a mapping relationship determining sub-unit, which is configured to code the divided geographical cells, obtain the mapping relationship between a code of each geographical cell and each fixed satellite subpoint trajectory, and form a network addressing based on geographical location.

A deploying unit 1240, which is configured to perform, based on a deployment rule, a recursive incremental deployment according to the extended satellite network topological structure and realize integrated space-terrestrial network.

In the embodiments of the present application, the deploying unit 1240, based on a principle of full coverage for terrestrial communication, deploys the extended satellite network topological structure layer by layer and reduces an orbital height with an increase of layers to form a network structure having a backbone network and an access network.

Figure 13:
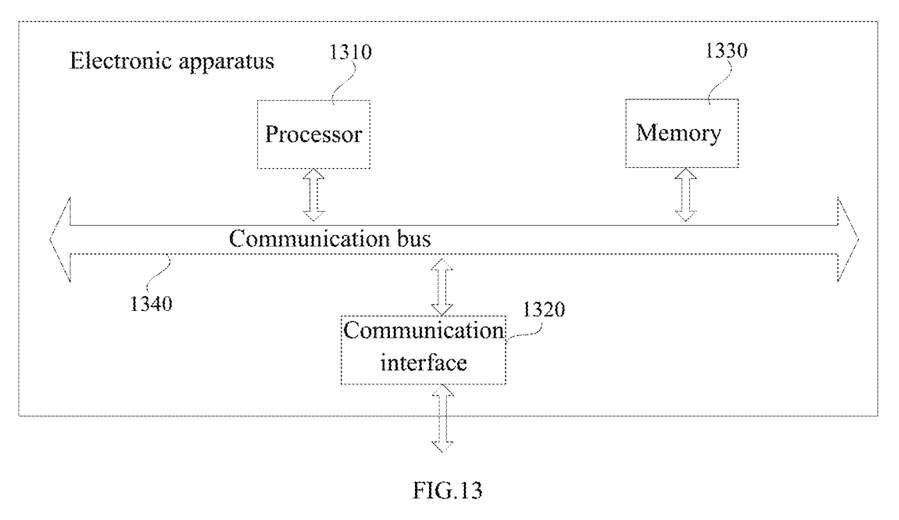
FIG. 13 is a structural diagram of an electronic apparatus provided by an embodiment of the present application.

The following will describe an electronic apparatus provided by the embodiments of the present application in conjunction with FIG. 13. FIG. 13 is a structural diagram of the electronic apparatus provided by the present application. As shown in FIG. 13, the electronic apparatus can include: a processor 1310, a communication interface 1320, a memory 1330 and a communication bus 1340. The processor 1310, the communication interface 1320 and the memory 1330 communicate with each other by the communication bus 1340. The processor 1310 can call a logic instruction which is stored in the memory 1330 to perform the method for constructing integrated space-terrestrial network provided by the above method embodiments. The method includes: obtaining a target constellation and standardizing a relative motion between each target satellite in the target constellation and earth's surface according to a principle of making a satellite running in a recursive earth-repeat orbit have fixed satellite subpoint trajectories; obtaining a recursively extended topological structure according to the target constellation; according to the extended topological structure, dividing geographical cells and obtaining a mapping relationship between the geographical cells and the satellite subpoint trajectories to facilitate networking management; and performing, based on a deployment rule, a recursive incremental deployment according to the extended satellite network topological structure and realizing integrated space-terrestrial network.

In addition, the logic instructions in the memory 1330 can be implemented in the form of software functional units and can be stored in a computer readable storage medium when being sold or used as independent product. Based on such understanding, the technical solutions of the embodiments of the present application in essence or the part that contributes to the prior art or the part of the technical solutions can be embodied in the form of a software product. The computer software product is stored in a storage medium, including a number of instructions to enable a computer device (such as personal computer, server, or network device, etc.) to perform all or a part of the steps of the methods described in each embodiment of the application. The aforementioned storage media includes: USB flash disk, mobile hard disk, Read-Only Memory (ROM), Random Access Memory (RAM), magnetic disk, compact disk and other media that can store program codes.

In the above terminal equipment embodiments, it should be noted that processor 1310 can be a central processing unit (CPU), or other general-purpose processors, digital signal processor (DSP), application specific integrated circuit (ASIC), etc. The general-purpose processor can be a microprocessor or any conventional processor, etc. The steps of the methods provided by the present application can be directly performed by a hardware processor or by a combination of hardware and software devices in the processor.

On the other hand, the embodiments of the present application further provide a computer program product. The computer program product includes a computer program stored in a non-transient computer readable storage medium, and the computer program includes program instruction. When the program instruction is executed by a computer, the computer can perform the method for constructing integrated space-terrestrial network provided by the above method embodiments. The method includes: obtaining a target constellation and standardizing a relative motion between each target satellite in the target constellation and earth's surface according to a principle of making a satellite running in a recursive earth-repeat orbit have fixed satellite subpoint trajectories; obtaining a recursively extended topological structure according to the target constellation; according to the extended topological structure, dividing geographical cells and obtaining a mapping relationship between the geographical cells and the satellite subpoint trajectories to facilitate networking management; and performing, based on a deployment rule, a recursive incremental deployment according to the extended satellite network topological structure and realizing integrated space-terrestrial network.

On the other hand, the embodiments of the present application further provide a non-transient computer readable storage medium, storing a computer program therein, and when the computer program is executed by a processor, causes the processor to implement the steps of the method for constructing integrated space-terrestrial network provided by the above embodiments. The method includes: obtaining a target constellation and standardizing a relative motion between each target satellite in the target constellation and earth's surface according to a principle of making a satellite running in a recursive earth-repeat orbit have fixed satellite subpoint trajectories; obtaining a recursively extended topological structure according to the target constellation; according to the extended topological structure, dividing geographical cells and obtaining a mapping relationship between the geographical cells and the satellite subpoint trajectories to facilitate networking management; and performing, based on a deployment rule, a recursive incremental deployment according to the extended satellite network topological structure and realizing integrated space-terrestrial network.

The device and equipment embodiments described above are only schematic, in which the unit described as a separation component can be or cannot be physically separated, and the component displayed as a unit can be or cannot be a physical unit. And, it can be located in a position or can be distributed to multiple network units. Some or all of the units can be selected according to the actual demands to realize the purpose of the scheme of the embodiments. Those of ordinary skill in the art can understand and implement the embodiments without creative labor.

Through the description of the above embodiment methods, those skilled in the art can clearly understand that each embodiment can be realized by software and the necessary general hardware platform, and of course, and it can also be realized by hardware. Based on such understanding, the technical solution in essence or the part that contributes to the prior art can be embodied in the form of a software product. The computer software product can be stored in a computer readable storage medium, such as ROM/RAM, magnetic disk, compact disk, etc., including several instructions to enable a computer device (e.g., personal computer, server, or network device) to perform the methods described in each embodiment or some parts of the embodiment.

Finally, it should be noted that the above embodiments are only used to explain the technical solutions of the present application, but are not limited thereto; although the present application has been described in detail with reference to the foregoing embodiments, it should be understood by those skilled in the art that they can still modify the technical solutions documented in the foregoing embodiments and make equivalent substitutions to a part of the technical features; these modifications and substitutions do not make the essence of the corresponding technical solutions depart from the scope of the technical solutions of various embodiments of the present application.

What is claimed is:

1. A method for constructing integrated space-terrestrial network, comprising:
    obtaining a target constellation and standardizing a relative motion between each target satellite in the target constellation and earth's surface according to a principle of making a satellite running in a recursive earth-repeat orbit have fixed satellite subpoint trajectories;
    obtaining a recursively extended topological structure according to the target constellation;
    according to the extended topological structure, dividing geographical cells and obtaining a mapping relationship between the geographical cells and the satellite subpoint trajectories to facilitate network addressing and networking management based on geographical location; and
    performing, based on a deployment rule, a recursive incremental deployment according to the extended satellite network topological structure, and realizing integrated space-terrestrial network.

2. The method according to claim 1, wherein, the obtaining the target constellation and standardizing the relative motion between each target satellite in the target constellation and earth's surface according to the principle of making the satellite running in the recursive earth-repeat orbit have fixed satellite subpoint trajectories comprises:

adjusting a period of the target satellite to make the target satellite form a fixed satellite subpoint trajectory;

setting an orbital height of the target satellite based on height adjustment rule to meet a full coverage of the target constellation for terrestrial communication; and adjusting the period and the orbital height of the target satellite and forming the target constellation, to make each target satellite form a fixed satellite subpoint trajectory and meet the full coverage for terrestrial communication.

3. The method according to claim 1, wherein, the obtaining the recursively extended topological structure according to the target constellation comprises:

constructing a base-class topological structure according to the target constellation and making each target satellite in the base-class topological structure share a same fixed satellite subpoint trajectory; and recursively extending the base-class topological structure according to an extension rule and forming the extended topological structure.

4. The method according to claim 3, after the constructing the base-class topological structure according to the target constellation and making each target satellite in the base-class topological structure share the same fixed satellite subpoint trajectory, further comprising:

setting a symmetric inter-satellite link mode for each target satellite in the base-class topological structure.

5. The method according to claim 4, wherein, the recursively extending the base-class topological structure according to the extension rule and forming the extended topological structure comprises:

during recursively extending, maintaining original inter-orbit link and adding intra-orbit link for adjacent satellites after shifting a time interval.

6. The method according to claim 1, wherein, the according to the extended topological structure, dividing geographical cells and obtaining the mapping relationship between the geographical cells and the satellite subpoint trajectories comprises:

dividing the geographical cells according to an area on earth's surface formed by intersection of the fixed satellite subpoint trajectory of each target constellation in the extended topological structure;

taking a preset location point of each geographical cell as an identification of each geographical cell; and coding the divided geographical cells, obtaining a mapping relationship between a code of each geographical cell and each fixed satellite subpoint trajectory, and forming a network addressing based on geographical location.

7. The method according to claim 1, wherein, the performing, based on the deployment rule, the recursive incremental deployment according to the extended satellite network topological structure, and realizing integrated space-terrestrial network comprises:

based on a principle of full coverage for terrestrial communication, deploying the extended satellite network topological structure layer by layer and reducing an orbital height with an increase of layers to form a network structure having a backbone network and an access network.

8. A device for constructing integrated space-terrestrial network, comprising a memory, a processor and a computer program stored in the memory and executable by the processor, wherein, when the program is executed by the processor, causes the processor to:

obtain a target constellation and standardize a relative motion between each target satellite in the target constellation and earth's surface according to a principle of making a satellite running in a recursive earth-repeat orbit have fixed satellite subpoint trajectories;

obtain a recursively extended topological structure according to the target constellation;

according to the extended topological structure, divide geographical cells and obtain a mapping relationship between the geographical cells and the satellite subpoint trajectories to facilitate network addressing and networking management based on geographical location; and perform, based on a deployment rule, a recursive incremental deployment according to the extended satellite network topological structure, and realize integrated space-terrestrial network.

9. An electronic apparatus, comprising a memory, a processor and a computer program stored in the memory and executable by the processor, wherein, when the program is executed by the processor, causes the processor to implement a method for constructing integrated space-terrestrial network, wherein, the method comprises:

obtaining a target constellation and standardizing a relative motion between each target satellite in the target constellation and earth's surface according to a principle of making a satellite running in a recursive earth-repeat orbit have fixed satellite subpoint trajectories;

obtaining a recursively extended topological structure according to the target constellation;

according to the extended topological structure, dividing geographical cells and obtaining a mapping relationship between the geographical cells and the satellite subpoint trajectories to facilitate network addressing and networking management based on geographical location; and performing, based on a deployment rule, a recursive incremental deployment according to the extended satellite network topological structure, and realizing integrated space-terrestrial network.

10. A non-transitory computer readable storage medium, having computer program stored therein, wherein, when the program is executed by the processor, causes the processor to implement the steps of a method for constructing integrated space-terrestrial network, comprising:

obtaining a target constellation and standardizing a relative motion between each target satellite in the target constellation and earth's surface according to a principle of making a satellite running in a recursive earth-repeat orbit have fixed satellite subpoint trajectories;

obtaining a recursively extended topological structure according to the target constellation;

according to the extended topological structure, dividing geographical cells and obtaining a mapping relationship between the geographical cells and the satellite subpoint trajectories to facilitate network addressing and networking management based on geographical location; and performing, based on a deployment rule, a recursive incremental deployment according to the extended satellite network topological structure, and realizing integrated space-terrestrial network.

11. The electronic apparatus according to claim 9, wherein, the obtaining the target constellation and standardizing the relative motion between each target satellite in the target constellation and earth's surface according to the principle of making the satellite running in the recursive earth-repeat orbit have fixed satellite subpoint trajectories comprises:

adjusting a period of the target satellite to make the target satellite form a fixed satellite subpoint trajectories;

setting an orbital height of the target satellite based on height adjustment rule to meet a full coverage of the target constellation for terrestrial communication; and adjusting the period and the orbital height of the target satellite and forming the target constellation, to make each target satellite form a fixed satellite subpoint trajectory and meet the full coverage for terrestrial communication.

12. The electronic apparatus according to claim 9, wherein, the obtaining the recursively extended topological structure according to the target constellation comprises:

constructing a base-class topological structure according to the target constellation and making each target satellite in the base-class topological structure share a same fixed satellite subpoint trajectory; and recursively extending the base-class topological structure according to an extension rule and forming the extended topological structure.

13. The electronic apparatus according to claim 12, after the constructing the base-class topological structure according to the target constellation and making each target satellite in the base-class topological structure share the same fixed satellite subpoint trajectory, the method further comprises:

setting a symmetric inter-satellite link mode for each target satellite in the base-class topological structure.

14. The electronic apparatus according to claim 13, wherein, the recursively extending the base-class topological structure according to the extension rule and forming the extended topological structure comprises:

during recursively extending, maintaining original inter-orbit link and adding intra-orbit link for adjacent satellites after shifting a time interval.

15. The electronic apparatus according to claim 9, wherein, the according to the extended topological structure, dividing geographical cells and obtaining the mapping relationship between the geographical cells and the satellite subpoint trajectories comprises:

dividing the geographical cells according to an area on earth's surface formed by intersection of the fixed satellite subpoint trajectory of each target constellation in the extended topological structure;

taking a preset location point of each geographical cell as an identification of each geographical cell; and coding the divided geographical cells, obtaining a mapping relationship between a code of each geographical cell and each fixed satellite subpoint trajectory, and forming a network addressing based on geographical location.

16. The electronic apparatus according to claim 9, wherein, the performing, based on the deployment rule, the recursive incremental deployment according to the extended satellite network topological structure, and realizing integrated space-terrestrial network comprises:

based on a principle of full coverage for terrestrial communication, deploying the extended satellite network topological structure layer by layer and reducing an orbital height with an increase of layers to form a network structure having a backbone network and an access network.

* * * * *